July 1, 1969

T. LODE

3,453,543

DEVICE FOR COMPARING MAGNITUDES OF ELECTRICAL
SIGNALS OF DIFFERENT FREQUENCIES

Filed June 1, 1965

INVENTOR.
TENNY LODE
BY
Dugger Johnson & Westman
ATTORNEYS

United States Patent Office 3,453,543
Patented July 1, 1969

---

3,453,543
DEVICE FOR COMPARING MAGNITUDES OF ELECTRICAL SIGNALS OF DIFFERENT FREQUENCIES
Tenny Lode, Madison, Wis., assignor to Rosemount Engineering Company, a corporation of Minnesota
Continuation-in-part of application Ser. No. 78,633, Dec. 27, 1960. This application June 1, 1965, Ser. No. 460,413
Int. Cl. G01r 17/00
U.S. Cl. 324—98                                2 Claims

ABSTRACT OF THE DISCLOSURE

A device for measuring the magnitude of an electrical signal including a first signal source and a first frequency which is passed through signal paths in the first direction. A second signal source is provided and components of this second signal source are passed through the same paths. The direction of current flow from the second source through one of the paths is the same as the direction of current flow from the first signal source through that path, and is different from the direction of current flow through path from the first source. Means are provided for determining an average algebraic product of the magnitudes of the currents through the paths, and by doing so, the magnitude of one of the signals can be obtained.

---

This application is a continuation-in-part of my application, Ser. No. 78,633, filed Dec. 27, 1960 for electrical comparison instrument.

This invention relates to the comparison of the magnitudes of electrical signals of different frequencies, and to measurements, computations, conversions and other uses which may be made of such comparisons.

The accuracy with which AC signals may be measured has been generally inferior to the accuracy with which corresponding DC signals may be measured. For precise measurements of AC voltages, currents, or other signals, such as power, it has been customary to compare or convert the AC signal to or into a related DC signal which may be precisely measured by potentiometric or other methods. By providing more precise comparisons or conversions between AC and DC signals, the present invention makes possible more exact measurements of AC voltages, currents and other signals.

In various applications, particularly in electrical computing and control systems, it may be desirable to provide an AC reference voltage, current or other signal of stable and accurately known magnitude. With the present invention, the magnitude of an AC signal may be compared with the magnitude of a precisely known DC reference signal, and the AC signal magnitude controlled so that the magnitudes of the AC and DC signals exactly correspond. In this manner, a stable and precisely controlled AC reference signal may be obtained.

In control systems, computing systems, and in other applications, it may be desirable to convert an AC signal into a DC signal, a DC signal into an AC signal, or an AC signal of one frequency into an AC signal of a different frequency. With the present invention, the magnitude of a second electrical signal may be automatically or manually adjusted until it corresponds exactly with the magnitude of a first electrical signal, thus, effectively converting the first electrical signal into the form of the second electrical signal. This conversion process may be described as a linear conversion process. That is, if the first signal changes by a given percentage, the second corresponding signal will also change by the same percentage. In certain computing applications, and in other applications, non-linear comparisons or conversions may be desirable. With the present invention, it is possible to make precise non-linear comparisons of and conversions between electrical signals of different frequencies. For example, it is possible to compare the square or second power of the magnitude of a first electrical signal with the first power of the magnitude of a second electrical signal. In this manner comparisons or conversions may be made with respect to the square or square root of an electrical signal being compared or converted.

Other objects and advantages of the present invention may be seen from the drawings and the specification.

In the above description of the objects and advantages of this invention, and throughout this application, a DC signal will be considered a signal of zero frequency. Hence, references to two signals of different frequencies may signify one DC signal and one AC signal as well as two AC signals of different frequencies. A particular form of the present invention may incorporate an electrodynamometer movement including a fixed coil, a moveable coil and a means for measuring or observing a net unbalanced electromagnetic torque upon the moveable coil. A first electrical signal at a first frequency is applied to the fixed coil and the moveable coil in series, so as to produce an electromagnetic torque component upon the moveable coil in a first direction. A second electrical signal at a second frequency is applied to the fixed coil and the moveable coil in parallel, so as to produce an electromagnetic torque component upon the moveable coil in an opposing direction. An exact comparison, balance or equivalence between the two electrical signals will be indicated by a zero net torque upon the electrodynamometer moveable coil. The magnitude and direction of an unbalance, or an inexact comparison or conversion, between the two electrical signals will be indicated by the magnitude and direction of the net electromagnetic torque upon the moveable coil.

Representative frequencies of AC signals which may be measured with the present invention are 60 and 400 cycles per second. However, signals of frequencies below, between and/or above these particular frequencies may also be measured with the invention.

Figure 1:
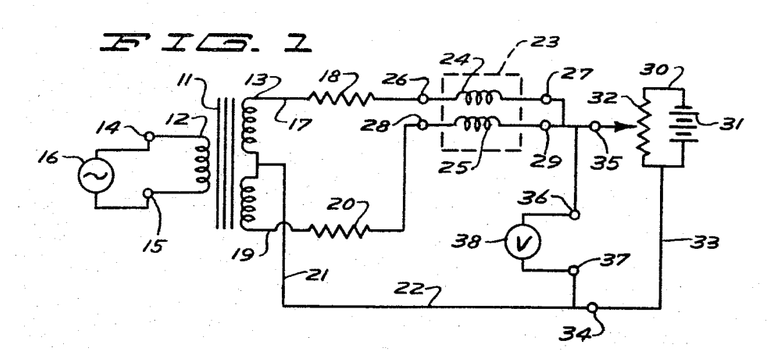
FIGURE 1 is a schematic representation of a first form of the invention, particularly illustrating its application as an AC voltage measuring or converting instrument.

Referring to the drawings and the numerals of reference thereon, FIGURE 1 includes an electromagnetic transformer 11 with a primary winding 12 and a center-tapped secondary winding 13. Primary winding 12 is connected to AC signal input terminals 14 and 15. AC voltage source 16 is connected across AC input terminals 14 and 15. A first end of secondary winding 13 connects via line 17 to resistor 18, which in turn connects to terminal 26. The opposite end of secondary winding 13 connects via line 19 to resistor 20, which connects in turn to terminal 28.

The center tap of secondary winding 13 connects via line 21 to common line 22. Electrodynamometer movement 23 includes a fixed coil 24 and a moveable coil 25. Fixed coil 24 connects to fixed coil terminals 26 and 27, and moveable coil 25 connects to moveable coil terminals 28 and 29. Variable DC voltage source 30 includes battery 31 and potentiometer 32 connected in parallel. Battery 31 and potentiometer 32 connect at one end via line 33 to DC voltage source terminal 34, which connects to common line 22. The moveable arm of potentiometer 32 connects to DC voltage source terminal 35. DC voltage measurement terminal 36 is connected in common with terminals 27, 29 and 35. DC voltage measurement terminal 37 connects to common line 22. DC voltmeter 38 is connected across terminals 36 and 37.

In a particular application, the circuit of FIGURE 1 may be employed to compare the magnitude of an AC voltage across terminals 14 and 15 due to AC voltage source 16, with the magnitude of the DC voltage across terminals 34 and 35 due to DC voltage source 30. The AC voltage across terminals 14 and 15 produces a corresponding AC voltage across secondary winding 13 of transformer 11. The AC electrodynamometer current path in the circuit of FIGURE 1 is from line 17 at one end of secondary winding 13 through resistor 18, terminal 26, fixed coil 24, terminals 27 and 29, moveable coil 25, terminal 28, resistor 20 and line 19 back to secondary winding 13. Thus, the AC electrodynamometer current circuit includes coils 24 and 25 in series, and the AC current component flows through coils 24 and 25 in opposite directions. A first DC electrodynamometer current path is from terminal 35 through terminal 27, fixed coil 24, terminal 26, resistor 18, line 17, one half of secondary winding 13, line 21 and common line 22 to terminal 34. A second parallel DC electrodynamometer current path is from terminal 35 through terminal 29, moveable coil 25, terminal 28, resistor 20, line 19, one half of secondary winding 13, line 21 and common line 22 to terminal 34. Thus, the DC electrodynamometer current paths include coils 24 and 25 in parallel, and the DC current components flow through coils 24 and 25 in the same direction.

The AC current component flowing through electrodynamometer coils 24 and 25 in opposite directions produces an electromagnetic torque component upon moveable coil 25 in a first direction. The DC current components flowing through coils 24 and 25 in the same direction produce an electromagnetic torque component upon moveable coil 25 in a direction opposite to that of the AC current produced torque component. A condition of balance, or zero average electromagnetic torque, indicates that the two opposing electromagnetic torque components are of equal average magnitude and that the magnitude of the DC signal corresponds to the magnitude of the AC signal.

In representative operation, transformer 11 may be assumed to be a unity phase splitting transformer. That is, if the voltage at terminal 14 with respect to terminal 15 is represented by $E_A$, the voltage induced across secondary winding 13 on line 17 with respect to line 21 will be $E_A$ and the voltage on line 19 with respect to line 21 will be $-E_A$. The voltage at DC voltage terminal 35 with respect to terminal 34 may be repreesnted by $E_D$. The resistances of resistors 18 and 20 may be represented by $R_1$ and $R_2$, respectively. Then, neglecting circuit and coil impedances except for resistors 18 and 20, the current through fixed coil 24 is $$I_{24} = \frac{E_A - E_D}{R_1}$$

Similarly, the current through moveable coil 25 is $$I_{25} = \frac{-E_A - E_D}{R_2}$$

In the above expressions and throughout this application the usual units of volts, amperes and ohms are assumed.

From the laws of electromagnetism the torque (or other force) upon moveable coil 25 is $$F = K I_{24} I_{25}$$

where K is a factor determined by the physical characteristics of movement 23. The potentiometer 32 is adjusted so that the average electromagnetic torque upon moveable coil 25 is zero, then $$\overline{F} = \overline{KI_{24}I_{25}} = \overline{\frac{K}{R_1 R_2}(E_A - E_D)(-E_A - E_D)}$$

where the bar above a term denotes an average value. Thus, $$-\overline{E_A^2} + \overline{E_D^2} - \overline{E_A E_D} + \overline{E_A E_D} = 0$$

Since the $\overline{E_A E_D}$ terms not only cancel, but are individually equal to zero, the condition for zero average electromagnetic torque is $$\overline{E_A^2} = \overline{E_D^2}$$

Thus, the circuit of FIGURE 1 allows an exact comparison of the magnitude of a DC voltage with the true RMS (root mean square) value of an AC voltage. Voltmeter 38, which reads the magnitude of the DC voltage across terminals 34 and 35, thus indicates RMS magnitude of the AC voltage across terminals 14 and 15 when the moveable arm of potentiometer 32 is adjusted for zero average electromagnetic torque upon movable coil 25. In this manner, the circuit of FIGURE 1 may be employed as an AC voltage measuring instrument. If the circuit of FIGURE 1 is employed as an AC to DC converter or demodulator, the DC voltage across terminals 36 and 37 when potentiometer 32 is adjusted for balance may be considered as the converted or demodulated DC voltage corresponding to the AC voltage across terminals 14 and 15.

Figure 2:
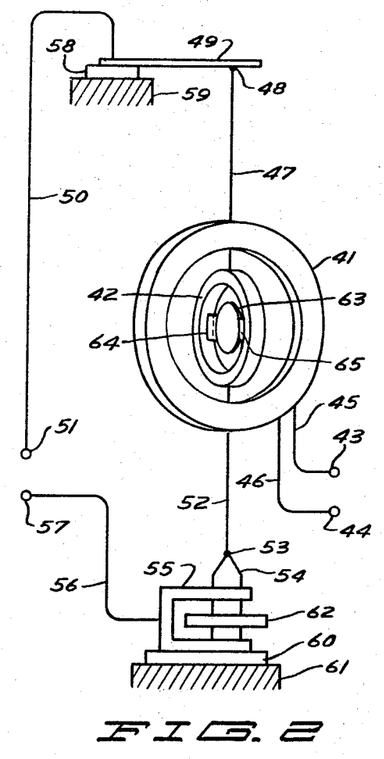
FIGURE 2 is a diagrammatic illustration of a particular form of electrodynamometer, which may be employed in the circuit of FIGURE 1.

FIGURE 2 illustrates a particular form of electrodynamometer movement, such as may be employed as movement 23 of FIGURE 1. The movement of FIGURE 2 includes a fixed coil 41 and a movable coil 42. Fixed coil terminals 43 and 44 connect to the winding of fixed coil 41 via leads 45 and 46 respectively. A first side of the winding of movable coil 42 is electrically connected via upper suspension wire 47, attachment point 48, spring 49 and line 50 to movable coil terminal 51. The opposite side of the winding of movable coil 42 is similarly connected via lower suspension wire 52, attachment point 53, azimuth adjustment shaft 54, azimuth adjustment shaft frame 55 and line 56 to movable coil input terminal 57. Suspension wires 47 and 52 pass through openings in fixed coil 41, and mechanically support movable coil 42 as well as providing electrical connections thereto. Support wire 47 is attached to spring 49 at attachment point 48. Insulator 58 separates spring 49 from mechanical support 59, and electrically insulates it therefrom. Spring 49 maintains a moderate tension on support wires 47 and 52 to restrict lateral motion of movable coil 42. Lower suspension wire 52 is mechanically and electrically attached to azimuth adjustment shaft 54 at attachment point 53. Azimuth adjustment wheel 62 is mechanically attached to shaft 54, and provides a means whereby shaft 54 may be conveniently rotated to adjust the angular rest position of movable coil 42. Frame 55 is supported by mechanical support 61, but is electrically insulated therefrom by insulator 60. Mirror 63 is mounted inside of and parallel with the plane of movable coil 42. Mirror 63 is mechanically supported by mirror supports 64 and 65.

In the instrument of FIGURE 2, azimuth adjustment wheel 62 may be rotated so as to establish the rest position of the plane of movable coil 42 perpendicular to the plane of fixed coil 41. The angular position of movable coil 42 may be observed with the aid of mirror 63. For example, a telescope may be employed to observe the reflection of a graduated scale in mirror 63, or the angular position of a beam of light reflected by mirror 63 may be observed on a translucent screen. In the perpendicular orientation, the position of minimum mutual inductance, an electromagnetic torque proportional to the product of the currents through fixed coil 41 and movable coil 42 will be produced upon movable coil 42. A non-zero average electromagnetic torque is indicated by a rotation of movable coil 42 from its rest position, which is permitted by the torsional compliance of suspension wires 47 and 52. The condition of zero average electromagnetic torque is indicated by the return of movable coil 42 to the rest or reference position. If desired, the magnitude and direction of a non-zero average electromagnetic torque may be determined by measuring the angular deviation of movable coil 42 from the reference position. Alternately, azimuth adjustment wheel 62 may be rotated so as to return movable coil 42 to its reference position, and the necessary rotation of wheel 62 taken as a measure of the average electromagnetic torque.

Figure 3:
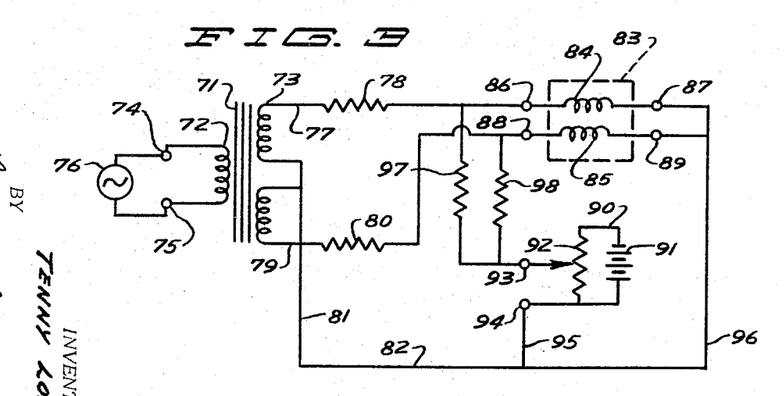
FIGURE 3 is a schematic representation of a second form of the invention, illustrating certain modifications upon the form of FIGURE 1.

FIGURE 3 is a schematic representation of a second form of the invention, illustrating certain modifications upon the form of FIGURE 1. The circuit of FIGURE 3 includes a transformer 71 with a primary winding 72 and a center tapped secondary winding 73. Primary winding 72 connects across AC input terminals 74 and 75. AC voltage source 76 also connects across terminals 74 and 75. A first end of secondary winding 73 connects via line 77 to resistor 78, which connects to terminal 86. The opposite end of secondary winding 73 connects via line 79 to resistor 80, which connects to terminal 88. The center tap of secondary winding 73 connects via line 81 to common line 82. Electrodynamometer movement 83 includes fixed coil 84 and movable coil 85. Fixed coil 84 connects to fixed coil terminals 86 and 87, and movable coil 85 connects to movable coil terminals 88 and 89. Variable DC voltage source 90 includes battery 91 and potentiometer 92 connected in parallel. Battery 91 and potentiometer 92 connect at one end to DC voltage terminal 94, which connects via line 95 to common line 82. The movable arm of potentiometer 92 connects to DC voltage terminal 93. Terminals 87 and 89 connect to common line 82 via line 96. Resistor 97 connects between terminal 86 and terminal 93. Resistor 98 connects between terminal 88 and terminal 93. Electrodynamometer movement 83 may be of a form similar to that of movement 23 of FIGURE 1, and in particular may be of the form illustrated in FIGURE 2.

In the example of FIGURE 1, AC and DC current components flow simultaneously through both fixed coil 24 and movable coil 25. The summation of AC and DC current components is achieved by applying the sum of an AC and a DC voltage across a coil and resistor series combination. For example, neglecting small circuit reactances, the current through resistor 18 and fixed coil 24 will be proportional to the voltage between line 17 and terminal 27. The voltage across line 17 and terminal 27 is the sum of the AC voltage across line 17 and 21 and the DC voltage across terminals 34 and 35. Figure 3 illustrates one alternate method of combining AC and DC current components for comparison while flowing simultaneously through the individual electrodynamometer coils. An AC voltage across input terminals 74 and 75 will induce an AC voltage in secondary winding 73 across lines 77 and 79. This induced AC voltage will cause an AC current component to flow in the circular loop which may be traced from line 77 through resistor 78, terminal 86, fixed coil 84, terminals 87 and 89, movable coil 85, terminal 88, resistor 80, line 79 and secondary winding 73 back to line 77. The DC voltage due to DC voltage source 90 across terminals 93 and 94 will cause DC current components to flow in two parallel paths. A first DC current path extends from terminal 93 through resistor 97, terminal 86, fixed coil 84, terminal 87, line 96, common line 82 and line 95 to terminal 94. A second DC current path extends from terminal 93 through resistor 98, terminal 88, movable coil 85, terminal 89, line 96, common line 82 and line 95 to terminal 94.

As in the case of FIGURE 1, the AC current component flowing through the coils of electrodynamometer movement 83 will cause an average electromagnetic torque component in one direction. The DC current components flowing through coils 84 and 85 will cause an average electromagnetic torque component in the opposite direction. The moveable arm of potentiometer 92 may be adjusted until a condition of zero average electromagnetic torque is observed on moveable coil 85 of electrodynamometer movement 83. Then, if resistors 78, 80, 97 and 98 are of equal magnitude and if other circuit impedances may be neglected, the DC voltage across terminals 93 and 94 will correspond to the RMS value of the AC voltage across terminals 74 and 75. If transformer 71 is assumed to be a unity phase splitting transformer similar to transformer 11 of FIGURE 1, electromagnetic torque balance at moveable coil 85 will indicate equality of the RMS AC voltage across terminals 74 and 75 with the DC voltage across terminals 93 and 94.

Figures 4, 6, 7:
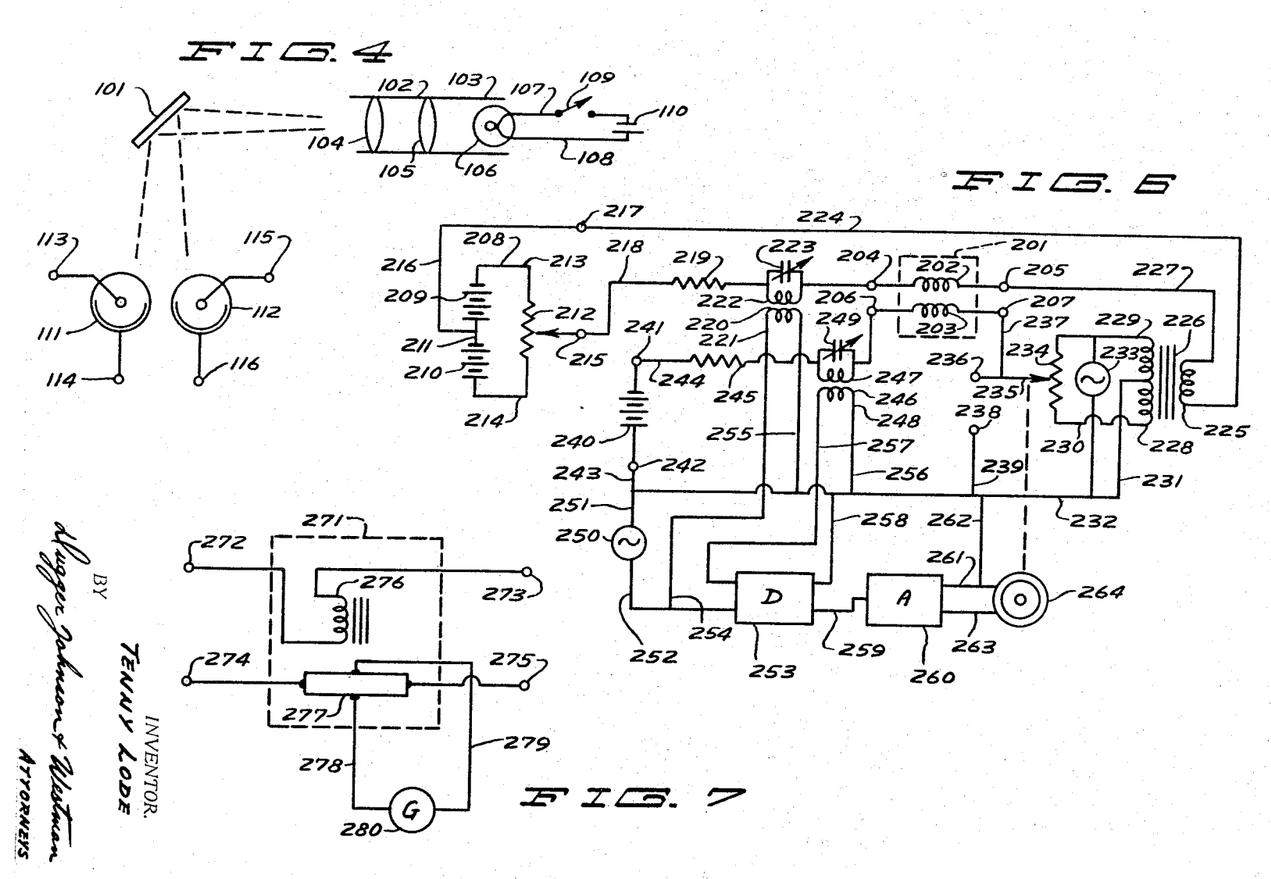
FIGURE 4 is a diagrammatic and schematic illustration of a particular means of electrically determining the angular position of the movable coil assembly of an electrodynamometer such as that shown in FIGURE 2.
FIGURE 6 is a schematic representation of a fourth form of the invention, particularly illustrating its application as a modulator or demodulator.
FIGURE 7 is a diagrammatic and schematic illustration of an alternate form of a current product sensing device which may be employed in various forms of the invention.

FIGURE 4 illustrates a particular means of electrically determining the angular position of the moveable coil assembly of an electrodynamometer movement such as that of FIGURE 2. In FIGURE 4, mirror 101 is assumed to be mechanically connected to the moveable coil assembly of the electrodynamometer movement, and corresponds to mirror 63 of FIGURE 2.

The view of mirror 101 is, for example, from above so the axis of rotation of mirror 101 is perpendicular to the plane of FIGURE 4. Light source 102 includes mounting tube 103, lenses 104 and 105 and electric lamp bulb 106. Lamp bulb 106 connects via lines 107 and 108 to the series combination of switch 109 and battery 110. Photoelectric cells 111 and 112 may be conventional vacuum photoemissive cells. Photoelectric cell 111 includes an anode which connects to terminal 113 and a cathode which connects to terminal 114. Photoelectric cell 112 includes an anode which connects to terminal 115 and a cathode which connects to terminal 116.

In typical operation, the closing of switch 109 lights lamp bulb 106 and causes light source 102 to project a beam of light upon mirror 101. If mirror 101 is in its normal or reference position, as shown in FIGURE 4, photoelectric cells 111 and 112 will be equally illuminated by reflected light from light source 102. If mirror rotates clockwise, photoelectric cell 111 will receive more reflected light than cell 112. Conversely, if mirror 101 rotates counterclockwise, cell 112 will receive more reflected light than cell 111. With suitable circuits connected to cells 111 and 112, the configuration of FIGURE 4 allows the electrical measurement of motion of the moveable coil assembly of an electrodynamometer movement. Electrical position measurements may be employed to provide a remote indication of the position of an electrodynamometer moveable coil and/or automatic balancing capability such as is illustrated in FIGURE 5.

Figure 5:
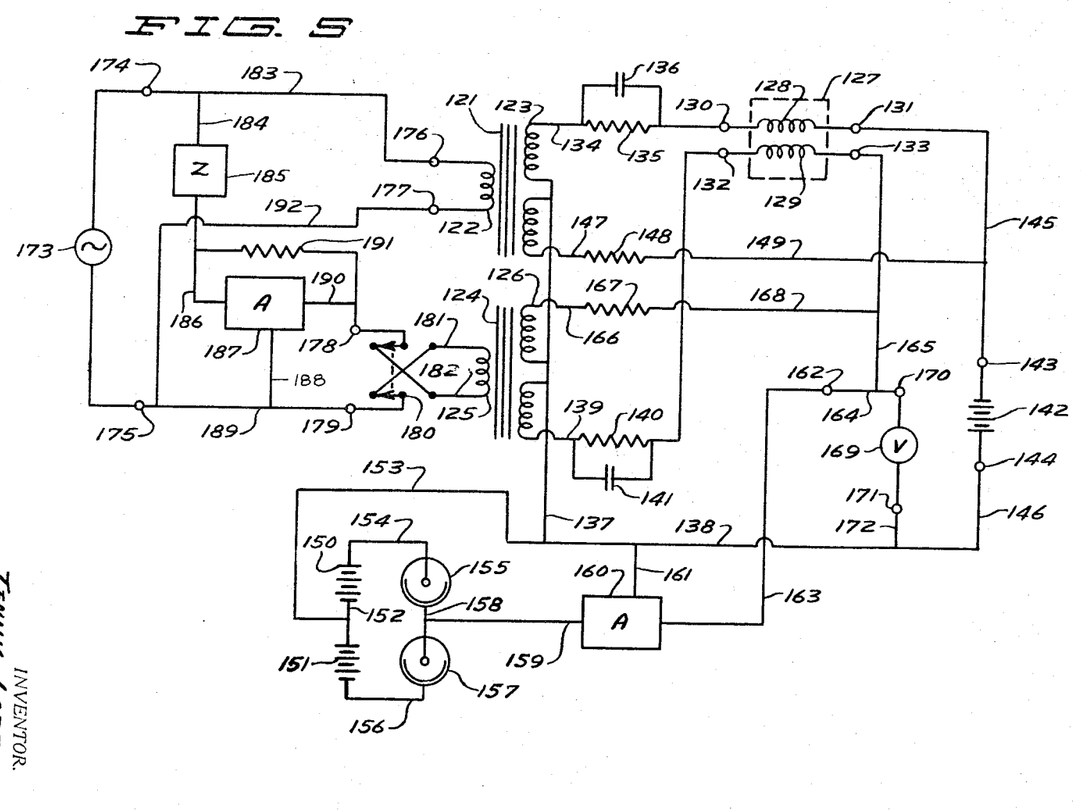
FIGURE 5 is a schematic representation of a third form of the invention, particularly illustrating its application for the measurement of power.

FIGURE 5 is a schematic illustration of a third form of the invention, particularly illustrating its application in the measurement of power, and includes circuits for automatically adjusting one of the signals being compared. In FIGURE 5, input transformer 121 includes primary winding 122 and center-tapped secondary winding 123. Input transformer 124 includes primary winding 125 and center-tapped secondary winding 126. Electrodynamometer movement 127 may be of the form illustrated in FIGURE 2, and includes fixed coil 128 and moveable coil 129. Fixed coil 128 connects to fixed coil terminals 130 and 131, and moveable coil 129 connects to moveable coil terminals 132 and 133. A first end of secondary winding 123 connects via line 134 to the parallel combination of resistor 135 and capacitor 136, which connects to terminal 130. The center tap of secondary winding 123 connects via line 137 to common line 138. A first end of secondary winding 126 connects via line 139 to the parallel combination of resistor 140 and capacitor 141, which connects to terminal 132. The center tap of secondary winding 126 connects to common line 138 via line 137. DC reference voltage source 142 connects to DC reference voltage terminals 143 and 144. Terminal 143 connects via line 145 to terminal 131. Terminal 144 connects via line 146 to common line 138. The second end of secondary winding 123 connects via line 147 to resistor 148. Resistor 148 connects via line 149 to line 145 and terminal 143. Batteries 150 and 151 are connected in series by line 152, which connects via line 153 to common line 138. The positive side of battery 150 connects via line 154 to the anode of photoelectric cell 155, and the negative side of battery 151 connects via line 156 to the cathode of photoelectric cell 157. The anode of photoelectric cell 157 connects to the cathode of photoelectric cell 155 via line 158, which connects via line 159 to the input of DC amplifier 160. DC amplifier 160 connects to common line 138 via line 161, and to DC amplifier output terminal 162 via line 163. Terminal 162 connects via line 164 to terminal 170, and via line 165 to terminal 133. The second end of secondary winding 126 connects via line 166 to resistor 167. Resistor 167 connects via line 168 to line 165 and terminal 162. DC voltmeter 19 connects to DC voltage measurement terminals 170 and 171. Terminal 171 connects via line 172 to common line 138. AC power source 173 connects to AC power input terminals 174 and 175. Primary winding 122 of transformer 121 connects to terminals 176 and 177. Terminals 178 and 179 connect to reversing switch 180, which connects via lines 181 and 182 to primary winding 125 of transformer 124. Terminal 174 connects via line 183 to terminal 176, and via line 184 to AC load 185. AC load 185 connects via line 186 to the input of amplifier 187. Amplifier 187 connects via lines 188 and 189 to terminal 175, and via line 190 to terminal 178. Terminal 175 connects to terminal 179 via line 189. Resistor 191 connects from line 186 to line 190. Terminal 175 connects via line 192 to terminal 177.

The circuit of FIGURE 5 is arranged to function as a wattmeter measuring power consumed (or generated) by electrical load 185. AC power source 173 provides an AC voltage across terminals 174 and 175. Current drawn (or generated) by load 185 passes from terminal 174 through lines 183 and 184, load 185, line 186, amplifier 187 and lines 188 and 189 to terminal 175. Amplifier 187 and resistor 191 are arranged in a feedback circuit familiar to the electronic analog computing field. Amplifier 187 is assumed to be a high input impedance, high gain inverting amplifier whose input is on line 186 and whose output is on line 190, both with respect to line 188. Amplifier 187 will produce a voltage signal on line 190 to maintain the voltage across lines 186 and 189 at a negligible value. Since the input of amplifier 187 is of high impedance, the current through resistor 191 must essentially equal the current through load 185. Thus, the voltage drop across resistor 191 will be equal to the current through load 185 times the resistance of resistor 191 in ohms. Amplifier 187 and its associated circuits serve as a current to voltage converter, providing a voltage across terminals 178 and 179 which is a convenient measure of the current flowing through AC load 185 without introducing a significant voltage drop between line 186 and terminal 175. Hence, the voltage across terminals 176 and 177 is essentially equal to the voltage across load 185.

The power drawn by load 185 is equal to the product of the voltage across load 185 and the current through load 185. Hence, the power drawn by load 185 is equal to the product of the voltage across terminals 176 and 177, the voltage across terminals 178 and 179 and the resistance of resistor 191. The circuit of FIGURE 5 measures the power drawn by load 185 by measuring the product of the voltages. As is customary, the term AC power will be generally understood to refer to a value averaged over one or more cycles, rather than an instantaneous value, unless stated otherwise.

The AC voltage across terminals 176 and 177 induces an AC current component in the circular loop which may be traced from line 134 through the parallel combination of resistor 135 and capacitor 136, terminal 130, fixed coil 128, terminal 131, line 145, line 149, resistor 148, line 147, and secondary winding 123 back to line 134. The AC voltage across terminals 178 and 179, and, hence, across lines 181 and 182, induces an AC current component in the circular loop which may be traced from line 139 through the parallel combination of resistor 140 and capacitor 141, terminal 132, moveable coil 129, terminal 133, line 168, resistor 167, line 166, and secondary winding 126 back to line 139. In typical operation, an electromagnetic torque component will be produced upon moveable coil 129 proportional to the average product of the AC current components through coils 128 and 129. Hence, this AC electromagnetic torque component will be proportional to the power drawn by load 185. DC reference voltage source 142 will cause a DC current component to flow in the circular loop which may be traced from terminal 143 through line 145, terminal 131, coil 128, terminal 130, the parallel combination of resistor 135 and capacitor 136, line 134, secondary winding 123, line 137, common line 138, line 146, terminal 144 and DC reference voltage source 142 back to terminal 143. The DC voltage output of DC amplifier 160 will cause a DC current component to flow in the circular loop which may be traced from terminal 162 through lines 164 and 165, terminal 133, coil 129, terminal 132, the parallel combination of resistor 140 and capacitor 141, secondary winding 126, line 137, common line 138, line 161, DC amplifier 160 and line 163 back to terminal 162. In operation, an electromagnetic torque component will be produced upon moveable coil 129 proportional to the product of the DC current components through coils 128 and 129. Since the average product of an AC current and a DC current is zero, there will be no electromagnetic torque components of non-zero average value produced by the interaction of an AC current in one of the electrodynamometer coils and a DC current in the other. Hence, the total average electromagnetic torque upon moveable coil 129 will be the sum of the average torque component produced by the AC current components and the average torque component produced by the DC current components. Electromagnetic torque balance, or zero average electromagnetic torque, will indicate that the average product of the AC current components is equal to the product of the DC current components. It may be assumed that the DC resistances of secondary windings 123 and 126, the AC impedances of DC reference voltage source 142 and the output of DC amplifier 160 across terminals 162 and line 161 are negligible. Since the impedance of the path from line 134 through coil 128 to terminal 131 and the impedance of the path from line 139 through coil 129 to terminal 133 are essentially the same at the AC measurement frequency as at DC, equality of the average product of the AC current components through the electrodynamometer coils with the DC coil current components implies that the average product of the AC voltage across lines 134 and 137 with the AC voltage across lines 139 and 137 is equal to the product of the DC voltage across terminals 143 and 144 and the DC voltage across terminals 162 and line 161. Hence, for zero average electromagnetic torque upon moveable coil 129, the power drawn by load 185 will be proportional to the product of the DC voltage across terminals 143 and 144, and the DC voltage across terminal 162 and line 161. If the DC voltage across terminals 143 and 144 is assumed to be a constant and known value, the power drawn by load 185 may be read by DC voltmeter 169 in terms of the DC voltage across terminals 170 and 171.

FIGURE 5 illustrates one technique for automatic balancing or zeroing of the average electromagnetic torque upon moveable coil 149. Photoelectric cells 155 and 157 correspond to cells 111 and 112 of FIGURE 4, and are arranged so as to be illuminated by a light beam reflected from a mirror attached to moveable coil 129. For example, it may be assumed that terminal 143 is at a positive potential with respect to terminal 144 and that a positive potential on terminal 162 with respect to line 161 will cause an electromagnetic torque component in a first direction upon moveable coil 129. If DC amplifier 160 is assumed to be an inverting amplifier, the elements of FIGURE 5 may be arranged so that movement of coil 129 in the first direction will cause cell 155 to receive more illumination and cell 157 to receive less illumination. This will cause the potential on line 159 with respect to line 153 to change in a positive direction. The output of amplifier 160 at terminal 162 will then change in a negative direction changing the DC current component produced torque component so as to move the moveable coil 129 in a direction opposite the first direction. The circuit of FIGURE 5 will thus automatically vary the potential at terminal 162 so as to continually balance the electrodynamometer movement at a condition of zero average electromagnetic torque. Hence, the power drawn by load 185 may be read from DC voltmeter 169 without manual adjustment or manipulation of the instrument.

The circuit of FIGURE 5 includes provision for balancing the DC current through transformers 121 and 124. In the circuits of FIGURES 1 and 3, where only a single AC voltage signal is applied to the electrodynamometer movement, the DC currents flowing through the two halves of secondary windings 13 and 73 oppose each other so that the net apparent DC current through transformers 11 and 71 is zero. With precision instrument transformers, it is often desirable to maintain the net apparent DC current through the windings at a small value. In the circuit of FIGURE 5, resistor 148 is of the same magnitude as resitsor 135 so that the DC current through secondary winding 123 from line 147 to line 137 is approximately equal in magnitude and opposing in direction to the DC current from line 134 to line 137. In this manner the net apparent DC current through winding 123 is reduced to a negligible value. Resistor 167 is of the same magnitude as resistor 140. DC current through secondary winding 126 from line 166 to line 137 similarly opposes DC current line 139 to line 137, and reduces the net apparent DC current through winding 126 to a negligible value.

Capacitors 136 and 141 are employed as one means for tive reactance in coils 128 and 129. At zero frequency (DC), the impedance of the combination of resistor 135, capacitor 136 and coil 128, measured from line 134 to terminal 131, will be equal to the sum of the resistances of resistor 135 and coil 128. At an AC measurement frequency, the impedance of the same combination will be increased by the inductive reactance of coil 128 and reduced by the shunt reactance of capacitor 136 in parallel with resistor 135. If the magnitude of capacitor 136 is in accordance with the expression $$C=(\sqrt{2}-1)L/R^2$$

where C is the magnitude of capacitor 136 in farads, L the inductance of coil 128 in henries and R the resistance of resistor 135 in ohms, the total impedance of the combination of elements 135, 136 and 128 will be nearly constant over a wide range of frequencies. Other frequency compensation techniques may also be employed to increase the accuracy of AC measurements and comparisons.

In the circuit of FIGURE 5, power drain by load 185 will be indicated by a DC voltage of one polarity across terminals 170 and 171. If power is generated by load 185 and delivered to source 173, which may be considered as a negative power consumption, it will be indicated by a DC voltage of reversed polarity across terminals 170 and 171. If desired, reversing switch 180 may be operated to reverse polarity of the apparent power consumption. In particular, it is possible to manipulate reversing switch 180 so that either a positive or negative power consumption may be measured as a positive or negative power consumption as desired.

FIGURE 6 is a schematic representation of a fourth form of the invention, particularly illustrating its application as a modulator or demodulattor, and includes circuits for automatically adjusting one of the signals being compared. In FIGURE 6, electrodynamometer movement 201 may be of the form illustrated in FIGURE 2 and includes fixed coil 202 and moveable coil 203. Fixed coil 202 connects to fixed coil terminals 204 and 205, and moveable coil 203 connects to moveable coil terminals 206 and 207. Reversible polarity variable DC voltage source 208 includes batteries 209 and 210 connected in series via line 211. Battery 209 connects via line 213 to a first end of potentiometer 212, and battery 210 connects via line 214 to the second end of potentiometer 212. The moveable arm of potentiometer 212 connects to DC voltage terminal 215. Line 211 connects via line 216 to DC voltage terminal 217. Terminal 215 connects via line 218 to resistor 219. High frequency transformer 220 includes primary winding 221 and secondary winding 222, which is connected in parallel with variable capacitor 223. Resistor 219 connects via the parallel combination of secondary winding 222 and variable capacitor 223 to terminal 204. DC voltage terminal 217 connects via line 224 to a first side of secondary winding 225 of transformer 226. The second side of primary winding 225 connects via line 227 to terminal 205. A first end of center-tapped primary winding 228 of transformer 226 connects to line 229, and the second end of primary winding 228 connects to line 230. The center tap of primary winding 228 connects via line 231 to common line 232. AC voltage source 233 connects between line 229 and common line 232. Potentiometer 234 connects across lines 229 and 230. The moveable arm of potentiometer 234 connects via line 235 to AC voltage terminal 236, and via line 237 to terminal 207. AC voltafe terminal 238 connects via line 239 to common line 232. DC reference voltage source 240 connects to DC voltage terminals 241 and 242. Terminal 242 connects via line 243 to common line 232. Terminal 241 connects via line 244 to resistor 245. High frequency transformer 246 includes primary winding 247 and secondary winding 248. Primary winding 247 is connected in parallel with variable capacitor 249. Resistor 245 connects through the parallel combination of primary winding 247 and variable capacitor 249 to terminal 206. High frequency voltage source 250 connects bia line 251 to common line 232, and via line 252 to phase sensitive demodulator 253, High frequency AC voltage source 250 connects via line 254 to primary winding 221, which connects via line 255 to common line 232. Secondary winding 248 connects via line 256 to common line 232, and via line 257 to phase sensitive demodulator 253. Phase sensitive demodulator 253 connects via line 258 to common line 232, and via line 259 to DC amplifier 260. DC amplifier 260 connects via lines 261 and 263 to DC servomotor 264, and via line 262 to common line 232. Servomotor 264 is mechanically coupled to potentiometer 234 and positions the moveable arm thereof.

The circuit of FIGURE 6 is arranged to function as a modulator converting a DC voltage input signal into a corresponding AC voltage output signal. The magnitude of the AC voltage signal will be proportional to the magnitude of the DC voltage signal. The phase of the AC output signal will be positive or negative in accordance with the polarity of the DC input voltage. In the example of FIGURE 6, DC voltage source 208 provides a DC voltage of variable magnitude and reversible polarity across terminals 217 and 215. This DC voltage causes a corresponding DC current component to flow in the circular path which may be traced from terminal 217 through line 224, winding 225, line 227, terminal 205, fixed coil 202, terminal 204, the parallel combination of winding 222 and variable capacitor 223, resistor 219, line 218, terminal 215, variable DC voltage source 208 and line 216 back to terminal 217. DC reference voltage source 240 provides a DC voltage across terminals 241 and 242, which will normally be of fixed and constant magnitude. This DC voltage will cause a corresponding DC current component to flow in the circular path which may be traced from terminal 241 through line 244, resistor 245, the parallel combination of winding 247 and variable capacitor 249, terminal 206, moveable coil 203, terminal 207, line 237, line 235, potentiometer 234, line 229 and/or line 230 (depending upon the setting of potentiometer 234), winding 228, line 231, common line 232, line 243, terminal 242 and voltage source 240 back to terminal 241. AC voltage source 233 provides an AC voltage, which will normally be of constant magnitude, wave shape and frequency, across line 229 and common line 232. Primary winding 228 of transformer 226 may be assumed to be a center-tapped, phase inverting winding which provides an AC voltage on line 230 with respect to common line 232, of equal magnitude but opposite phase to the AC voltage on line 229. When the movable arm of potentiometer 234 is at the end connected to line 229, the AC voltage on line 235 with respect to common line 232 will be essentially equal in magnitude and phase to the voltage on line 229. If the movable arm of potentiometer 234 is moved towards the center, the voltage on line 235 will continue to be of essentially the same phase as the voltage on line 229 but will decrease in magnitude towards zero. As the moveable arm of potentiometer 234 is moved through its center position towards the end connected to line 230, the voltage on line 235 with respect to line 232 will decrease through zero and then increase in magnitude in a phase opposite to that of the voltage on line 229, approaching the magnitude and phase of the voltage on line 230. Thus, the AC voltage on line 235 with respect to common line 232 may be considered as of variable magnitude and reversible phase, and depending upon the setting of potentiometer 234. This variable AC voltage will cause a corresponding AC current component to flow in the circular path which was previously traced through moveable coil 203.

The AC voltage across primary winding 228 of transformed 226 induces a corresponding AC voltage across secondary winding 225, and across lines 224, and 227. This AC voltage causes a corresponding AC current component to flow through the circular path which was previously traced through fixed coil 202.

As in the previously discussed example of FIGURE 5, a zero average electromagnetic torque upon moveable coil 203 will indicate that the product of the DC current components through electrodynamometer coils 202 and 203 is equal in magnitude and opposing in direction to the product of the AC current components through these same coils. As in the case of FIGURE 5, this also implies that the product of the DC voltage across terminals 215 and 217 and the DC voltage across terminals 241 and 242 is equal in magnitude and opposing in direction to the product of the AC voltage across lines 224 and 227 and the AC voltage across line 235 and common line 232. Assuming the DC voltage across terminals 241 and 242 and the AC voltage across lines 224 and 227 to be constant, electromagnetic torque balance will indicate that the AC voltage across line 235 and common line 232 is proportional in both magnitude and phase to the magnitude and polarity of the DC voltage across terminals 215 and 217. The polarity of the DC voltage across terminals 215 and 217 is measured with respect to the polarity of the DC voltage across terminals 241 and 242. The phase of the AC voltage across line 235 and common line 232 is measured with respect to the phase of the AC voltage across lines 224 and 227. In particular, if the magnitude of the AC voltage across lines 224 and 227 is equal to the magnitude of the DC voltage across terminals 241 and 242, electromagnetic torque balance at moveable coil 203 will indicate that the AC voltage across line 235 and common line 232 is equal in magnitude and phase to the magnitude and polarity of the DC voltage across terminals 215 and 217. Thus, the DC voltage across terminals 215 and 217 may be converted into a corresponding AC voltage which may be measured, or otherwise employed, and which is available across terminals 236 and 238. This process may be considered as a conversion or modulation of a DC voltage into a corresponding AC voltage.

A particular advantage of the circuit of FIGURE 6 is that variable DC voltage source 208, and circuit elements connected thereto, are floating and need not be connected to a system ground or a common line. In particular, the circuit including DC voltage source 208 need not be connected to common line 232.

FIGURE 6 illustrates an additional technique for automatically balacing the electromagnetic torque upon moveable coil 203. High frequency voltage source 250 excites primary winding 221 of high frequency transformer 220. This causes an induced high frequency current to flow through the circular path including fixed coil 202. In many forms of electrodynamometer movements, and in particular in the form illustrated in FIGURE 2, the preferred normal or reference position of the moveable coil is at the position of minimum mutual inductance between the fixed and moveable coils. Hence, in this preferred reference position, a high frequency current through fixed coil 202 will not induce a significant high frequency current in moveable coil 203. If moveable coil 203 is displaced from its reference position in a given direction, a high frequency current component will be induced in the circular path including a moveable coil 203 and the parallel combination of winding 247 and capacitor 249. This current will induce a corresponding high frequency voltage signal on line 257 with respect to common line 232. If moveable coil 203 is displaced in the opposite direction, the induced high frequency current through coil 203 and, hence, the induced high frequency voltage on line 257 will be of opposite phase. Thus, the magnitude and phase of the voltage on line 257, with respect to the phase of the output of high frequency generator 250, indicates the magnitude and direction of a displacement of moveable coil 203 from its reference position. Variable capacitors 223 and 249 allow the tuning of high frequency transformers 220 and 246 so as to increase their electrical efficiency. Depending upon the frequency of the AC voltage generated by high frequency voltage source 250, and the characteristics of transformer 226 and other circuit elements, it may be desirable to place a small capacitor across lines 224 and 227 and/or across line 235 and common line 232. This procedure may be desirable if, for example, the impedance of transformer 226 is higher than desired at the particular high frequency. Phase sensitive demodulator 253 produces a DC voltage on line 259 with respect to common line 232 whose magnitude and polarity indicates the magnitude and phase of the AC voltage on line 257 with respect to the phase of the AC voltage on line 252. Phase sensitive demodulators of this type are well known. See, for example, "Control System Components," John E. Gibson and Franz B. Tuer, McGraw-Hill Book Company, New York, 1958, Library of Congress catalogue card number 57–12581, chapter 6. The DC voltage on line 259 will drive DC amplifier 260, which drives servomotor 264, which in turn positions the moveable arm of potentiometer 234. Thus, the circuit of FIGURE 6 may be constructed so that an unbalanced electromagnetic torque upon moveable coil 203 will cause coil 203 to move from its normal or reference position, causing a high frequency error signal on line 257, causing a DC error signal on line 259, which causes servomotor 264 to adjust the moveable arm of potentiometer 234 so that electromagnetic torque balance upon coil 203 is restored and moveable coil 203 is returned to its normal or reference position.

In this manner, the circuit of FIGUE 6 automatically converts or modulates the reversible polarity DC voltage across terminals 217 and 215 into a corresponding AC voltage of controlled magnitude and reversible phase across terminals 236 and 238.

Various forms of the invention specifically illustrated in this application have employed rotary electrodynamometer movements, such as shown in FIGURE 2, for the purpose of determining the average product of two electrical currents. In particular, electrodynamometer movements have been employed to determine when the average product of two electrical currents is equal to zero. Other forms of electrodynamometer movements such as those utilizing linear rather than rotary forces, and other instruments capable of sensing or measuring current products may also be employed. In many instances it may be desirable to use multiple coil electrodynamometer movements to reduce the influences of external magnetic fields or other disturbances. In general, the invention disclosed herein may employ any satisfactory means of measuring the average product of two composite electrical current signals for the function of the electrodynamometer movements shown in the drawings.

FIGURE 7 illustrates one alternate form of current product sensing device which may be employed in various forms of the invention. The circuit of FIGURE 7 includes a current product sensor 271 which connects to a first pair of terminals 272 and 273 and a second pair of terminals 274 and 275. Current product sensor 271 includes magnetizing coil 276 which connects to terminals 272 and 273. Hall effect element 277 connects to terminals 274 and 275, and via lines 278 and 279 to galvanometer 280. If an electrical conductor or semiconductor is subjected to a magnetic field, and a current component is passed through this conductor in a direction perpendicular to the magnetic field, an electromotive force will be produced in a direction perpendicular to both the direction of the magnetic field and the direction of the applied current. This phenomenon is known as the Hall effect. The magnitude of the generated electromotive force will be equal to the product of the strength of the magnetic field, the magnitude of the applied current and a factor determined by the nature and geometry of the material through which the electromotive force is generated. In the case of certain semiconductors, such as indium antimonide, the magnitude of the Hall effect is particularly pronounced and may be employed as a convenient means for measuring the product of a magnetic field and an electrical current.

Hall effect element 277 is assumed to be of a semiconductor material, such as indium antimonide, which exhibts a particularly pronounced magnitude of the Hall effect. Coil 276 generates a magnetic field, proportional to the magnitude of the current passing from terminal 272 to terminal 273, which passes through Hall effect element 277. The Hall electromotive force is developed between the lines 278 and 279, and is proportional to the product of the current flowing from terminal 274 to terminal 275 and the magnetic field of coil 276. Hence, the electromotive force across lines 278 and 279 will be proportional to the product of the currents between terminals 272 and 273 and terminals 274 and 275. Galvanometer 280 indicates the average value of the voltage across lines 278 and 279 and, hence, the average product of the two currents through current product sensor 271. A zero average voltage across lines 278 and 279 will indicate a zero average product of the two currents through current product sensor 271. As a particular example, the circuit of FIGURE 7 may be substituted for electrodynamometer movement 23 of FIGURE 1. In this case, terminal 272 would connect to terminal 26, terminal 273 would connect to terminal 27, terminal 274 would connect to terminal 28, and terminal 275 would connect to terminal 29. In manually balanced circuits, such as that of FIGURE 1, the indication of galvanometer 280 may be employed as a direct means for visually determining when the average product of two currents is zero. In more complex systems, such as illustrated in FIGURES 5 and 6, the voltage across lines 278 and 279 may be fed to controlling instruments which will automtically adjust one or more signal quantities so as to obtain a condition of balance. In systems wherein an exact zero average current product is not maintained, the average Hall effect voltage across lines 278 and 279 may be employed as a measure of the value of the average current product.

The circuit of FIGURE 1, and other forms of the invention disclosed in this application, have been described in terms of comparisons, conversion, measurements and other applications possible when the circuit and/or the input signals thereto are adjusted so as to obtain a zero average electrodynamometer force or zero average current product through a current product sensor. In certain instances and in certain applications it may be desirable to employ the invention in a manner which does not require an exact balance of the electrodynamometer forces or an exact zero average current product. As a particular example, the DC voltage across terminals 34 and 35 of FIGURE 1 may be maintained at a fixed, precisely known value, and deviations of the magnitude of the AC voltage from a value corresponding to the magnitude of the DC voltage measured in terms of the magnitude and direction of the net average electromagnetic force upon moveable coil 25. Similarly, a fixed AC voltage may be applied to terminals 14 and 15 of FIGURE 1 and deviations of the DC voltage across terminals 34 and 35 from a value corresponding to the AC voltage read in terms of the magnitude and direction of the average electromagnetic force upon moveable coil 25. Other circuits wherein the magnitude of the average electromagnetic force upon the moveable coil, or average current product, is measured or otherwise employed may be devised for particular applications.

In various forms of the invention disclosed in this application, for example the form of FIGURE 1, an AC current component has been passed through electrodynamometer coils, or other current product sensor lines, in series and DC current components have been passed through the current product sensor lines in parallel. If desired, a DC current component may be passed through the current product sensor lines in series and AC current components passed through the current product sensor lines in parallel. For example, in the circuit of FIGURE 1, DC batteries may be substituted for the sections of secondary winding 13 between lines 21 and 17 and between lines 19 and 21. An AC voltage source may then be substituted for battery 31 across lines 30 and 33. With the circuit of FIGURE 1 thus modified, a DC current component will flow through electrodynamometer coils 24 and 25 in series, and an AC current component will flow through these coils in parallel. Balance may then be obtained as before by varying the position of the moveable arm of potentiometer 32 so as to obtain a zero average electromagnetic force upon moveable coil 25. In general, the previously described roles of AC and DC current source signals or of AC signals of different frequencies, in the illustrated forms of the invention may be interchanged without departing from the concept of the present invention.

The circuit of FIGURE 5 illustrates the use of the present invention to measure the average product of an AC voltage and an AC current. The invention may also be employed to measure other products such as the average product of two AC currents. For example, the circuit of FIGURE 5 measures the average product of the two AC voltages across terminals 176 and 177 and terminals 178 and 179. With the addition of a second current to voltage converter, such as that including amplifier 187 and resistor 191, the circuit of FIGURE 5 would be capable of measuring the average product of two AC currents.

For convenience of description the circuits specifically shown in the figures have illustrated comparisons between AC and DC signals. In these circuits, and in other circuits employing the present invention, AC signals of different frequencies may be employed in place of the DC balancing signals. For example, in the circuit of FIGURE 1, DC voltage source 31 may be replaced by an AC voltage generator whose frequency differs from that of AC voltage source 16. As before, the electromagnetic torque balance will indicate equality or proportionality of the RMS voltage across terminals 14 and 15 with the RMS AC voltage across terminals 34 and 35. In such instances an AC voltmeter may be substituted for DC voltmeter 38 of FIGURE 1.

In the preceding specification it has been assumed that AC signals under discussion have been essentially single frequency sinusoidal voltage or current waveforms. An advantage of the present invention in many applications is that it responds to the RMS value of applied signals of waveforms other than sinusoidal. Thus, for example, the circuit of FIGURE 1 may be employed as a means of measuring the true RMS value of non-sinusoidal and/or irregular AC waveforms.

In a general form, the present invention is capable of comparing the product of the two AC signals of a first frequency with the product of two signals of a different frequency (AC or DC). In the circuit of FIGURE 1, the product of a first signal with itself is compared with itself. By thus comparing the magnitudes of the squares of two signals, the magnitudes themselves are effectively compared. FIGURES 5 and 6, on the other hand, illustrate instances in which the product of two different DC signals is compared with the product of two different AC signals. An alternate form of operation would be the comparison of the product of two signals of a first frequency with the square of a signal of a second frequency. For, example, if voltage source 142 of FIGURE 5 were deleted and terminals 143 and 144 connected to terminals 170 and 171 respectively, the DC balance signal would be the square of the DC voltage across terminals 170 and 171. The voltage read by voltmeter 169 at balance would then be proportional to the square root of the power drawn or generated by load 135. As an additional example, voltage source 240 may be deleted from the circuit of FIGURE 6 and terminals 241 and 242 connected to terminals 217 and 215 respectively. The AC signal across terminals 236 and 238 under conditions of balance will then be proportional to the square of the DC voltage across terminals 215 and 217. Thus, by properly utilizing its product comparison capability, the present invention may be employed for the comparison of signals at one frequency with the square or square root of signals at a second frequency.

The preceding specification has described the present invention in terms of the comparison, conversion and interrelationship of signals at two different frequencies, one of which may be DC. In certain instances it may be desirable to intercompare or measure a sum of products or squares of signals of three or more different frequencies. For example, in the circuit of FIGURE 1, AC voltage source 16 may be replaced by two separate AC voltage sources connected in series, each generating a signal of a separate and distinct frequency. With such a connection, balance will be achieved when the moveable arm of potentiometer 32 is adjusted so that the DC voltage across terminals 35 and 34 is equal to the RMS sum of the two AC voltages of different frequencies being applied across terminals 14 and 15. Other circuits may be devised which will pass current components of as many frequencies as desired simultaneously through the coils of an electrodynamometer movement, or the lines of a suitable current product sensor. Torque balance, or a zero average current product, will then indicate that the sum of the products of the current components of individual frequencies is zero. Alternately, a non-zero sum of current product components may be read in terms of the net average electromagnetic force upon the electrodynamometer moveable coil, or the net average current product.

What is claimed is:

1. Means for measuring an electrical signal at a first frequency including means providing a first signal component and a second signal component at said first frequency, separate means providing third and fourth signal components both at a second different frequency, first and second current carrying paths, means connecting said first path to said means providing said first and third signal components such that current components corresponding to said first and third signal components flow in a first combination through said first path, means connecting said second path to said means providing said second and fourth signal components such that current components corresponding to said second and fourth signal components flow in a second different combination through said second path, means for determining an average algebraic product of the magnitude of the combination currents through said paths, and means for adjusting the magnitude of at least one of said electrical signal components to cause the average algebraic product of the currents through said paths to become essentially zero.

2. Apparatus for comparing the magnitudes of a first electrical signal at a first frequency and a second electrical signal at a second different frequency including a first source of said first signal at said first frequency, a second source of said second signal at said second different frequency, current product measuring means including first and second current paths and means responsive to an average algebraic product of the current magnitudes through said paths, means connecting said paths to said first source such that current components corresponding to said first signal flow through each of said paths in a first direction, means connecting said paths to said second source such that current components corresponding to said second signal flow through one of said paths in said first direction and through the other of said paths in an opposite direction, and means for adjusting the magnitude of at least one of said electrical signals to cause the average algebraic product of the current components through said paths to become substantially zero.

References Cited

UNITED STATES PATENTS

| | | | |
|---|---|---|---|
| 1,156,412 | 10/1915 | Lincoln | 324—106 |
| 1,624,178 | 4/1927 | Paine | 324—106 |
| 2,228,655 | 1/1941 | Downing et al. | 324—106 |
| 2,736,822 | 2/1956 | Dunlap | 324—45 XR |
| 1,689,660 | 10/1928 | Albrecht | 324—98 |

OTHER REFERENCES

Chasmar et al.: "An Electrical Multipler Utilizing the Hall Effect in Indium Arsenide," Electronic Engineering, November 1958, pp. 661, 662, 663, 664; copy in 235–194 HE.

RUDOLPH V. ROLINEC, *Primary Examiner.*

ERNEST F. KARLSEN, *Assistant Examiner.*

PO-1050
(5/69)

UNITED STATES PATENT OFFICE
CERTIFICATE OF CORRECTION

Patent No. 3,453,543       Dated July 1, 1969

Inventor(s) Tenny Lode

It is certified that error appears in the above-identified patent and that said Letters Patent are hereby corrected as shown below:

Column 6, line 52, after "mirror" insert --101. Column 9, line 55, after "for" insert --the compensation of frequency errors due to induc- --. Column 15, line 37, after "with" (second occurrence) insert --the product of a second signal with--.

SIGNED AND
SEALED

NOV 18 1969

(SEAL)
Attest:

Edward M. Fletcher, Jr.
Attesting Officer

WILLIAM E. SCHUYLER, JR.
Commissioner of Patents